United States Patent [19]
Kubota et al.

[11] Patent Number: 5,627,692
[45] Date of Patent: May 6, 1997

[54] RECORDING AND REPRODUCING APPARATUS FOR REPRODUCING TIME-BASE COMPRESSED SIGNALS DEPENDENT ON THE TIME-BASE COMPRESSION IMPLEMENTED

[75] Inventors: Yukio Kubota, Kanagawa; Hajime Inoue, Chiba, both of Japan

[73] Assignee: Sony Corporation, Tokyo, Japan

[21] Appl. No.: 662,261

[22] Filed: Jun. 7, 1996

Related U.S. Application Data

[63] Continuation of Ser. No. 253,283, Jun. 2, 1994, abandoned.

[30] Foreign Application Priority Data

Jun. 8, 1993 [JP] Japan ..................... 5-137651

[51] Int. Cl.$^6$ ................. G11B 5/00; G11B 5/09; G11B 5/02; H04N 5/78
[52] U.S. Cl. ................. 360/32; 360/53; 360/27; 386/81; 386/101; 386/111; 386/75
[58] Field of Search ............... 360/8, 10.1, 10.3, 360/19.1, 32, 48, 61, 53, 27; 358/335, 342

[56] References Cited

U.S. PATENT DOCUMENTS

| | | | |
|---|---|---|---|
| 4,342,053 | 7/1982 | Hirota | 360/64 |
| 4,829,497 | 5/1989 | Suko et al. | 369/50 |
| 4,870,509 | 9/1989 | Nagasawa et al. | 360/9.1 |
| 4,890,165 | 12/1989 | Hasegawa | 358/213.26 |
| 4,903,126 | 2/1990 | Kassatly | 358/146 |
| 4,963,995 | 10/1990 | Lang | 358/335 |
| 4,975,771 | 12/1990 | Kassatly | 358/146 |
| 5,057,932 | 10/1991 | Lang | 358/335 |
| 5,065,259 | 11/1991 | Kubota et al. | 360/8 |
| 5,130,792 | 7/1992 | Tindell et al. | 358/85 |

FOREIGN PATENT DOCUMENTS

| | | |
|---|---|---|
| 454460 | 10/1991 | European Pat. Off. |
| 3613230 | 10/1986 | Germany |

OTHER PUBLICATIONS

Patent Abstracts of Japan vol. 9, No. 6 (P-326) JP-A-59 154 617 (Nippon Victor) 3 Sep. 1984.
Patent Abstracts of Japan vol. 13, No. 490 (E-841) JP-A-01 194 688 (NEC) 4 Aug. 1989.
Patent Abstracts of Japan vol. 14, No. 158 (P-1027) JP-A-02 014 468 (Canon) 18 Jan. 1990.

*Primary Examiner*—W. C. Kim
*Attorney, Agent, or Firm*—William S. Frommer; Alvin Sinderbrand

[57] ABSTRACT

There is provided a recording/reproducing apparatus, e.g., digital video tape recorder, etc., applicable to a transmission system sufficiently utilizing communication capacity. The recording/reproducing apparatus comprises a recording element (e.g., rotary head) for recording, onto a recording medium (e.g., magnetic tape), time base compression processing implemented digital data delivered from the external, e.g., broadcasting station side, etc.; a control circuit for carrying out a control to read out the digital data from the recording medium at a speed lower than a recording speed in dependency upon the time base compression processing implemented to the digital data; and an output circuit for outputting, as a reproduced output, digital data which has been read out from the recording medium. In addition to the above-mentioned ordinary reproduction, in the case of carrying out fast-feed reproduction or rewinding reproduction, the control circuit carries out a control such that the magnetic tape runs at a higher speed, and the output circuit selects and outputs only valid digital data of digital data obtained by tracing of the rotary head.

11 Claims, 6 Drawing Sheets

RECORDING AND REPRODUCING APPARATUS FOR REPRODUCING TIME-BASE COMPRESSED SIGNALS DEPENDENT ON THE TIME-BASE COMPRESSION IMPLEMENTED

This application is a continuation of application Ser. No. 08/253,283, filed Jun. 2, 1994, abandoned.

BACKGROUND OF THE INVENTION

1. Field of the Invention

This invention relates to a recording/reproducing apparatus and a reproducing apparatus suitable when used in, e.g., a digital video tape recorder equipment, etc.

2. Description of the Related Arts

Nowadays, digital signal processing technology is being remarkably developed in broadcast using ground wave, satellite broadcast, cable television (CATV), telephone line and the like for transmitting picture signals and/or audio signals, because the transmission band is limited. There is proposed, in order to effectively utilize such limited transmission band, a compression transmission broadcasting system to compress not only picture data and audio data but also the time base by using digital signal processing technology to transmit picture/audio data which has undergone data compression and time base compression.

A compression transmitting apparatus for realizing such compression transmission broadcasting system is composed, of as shown in FIG. 6, a MPEG (Moving Picture Expert Group) encoder 100, a time base compressing circuit 101, and a frame forming (encoding) and modulating circuit 102.

The MPEG encoder 100 adaptively carries out switching between intraframe coding processing and interframe coding processing for compressing the picture data to conduct coding, and carries out motion compensating predictive coding in the interframe coding processing.

In the above example, the MPEG encoder 100 divides one picture comprised of, e.g., one frame or one field into so called macroblocks comprised of, e.g., 16 pixels×16 pixels to carry out motion compensating predictive coding in units of these macroblocks.

In more practical sense, as shown in FIG. 5, as the processing of the first stage, motion compensating predictive coding is successively implemented to Predictive-coded pictures (hereinafter simply referred to as P pictures) jumping over a predetermined number of pictures successive in point of time.

As the processing of the second stage, motion compensating predictive coding is implemented to Bidirectionally predictive-coded pictures (hereinafter simply referred to as B pictures) put between the P pictures or Intra-coded pictures (hereinafter simply referred to as I pictures) by using P picture or I picture before and after. It is to be noted that I picture is a picture subject to intraframe coding processing, i.e., a picture which is not subject to motion compensating predictive coding.

The MPEG encoder 100 carries out compression of picture data every predetermined block in this way to thereby allow the transmission rate of picture/audio data of the picture data and audio data obtained from an audio encoder (not shown) to be, e.g., 1.5 Mbps to deliver it to the time base compressing circuit 101.

The time base compressing circuit 101 implements a predetermined time base compression processing to picture/audio data every block to which the data compression processing has been implemented to thereby allow the transmission rate of the picture/audio data to be, e.g., 15 Mbps to deliver it to the frame forming and modulating circuit 102. Namely, since picture/audio data of 1.5 Mbps is compressed in a direction of the time base and is resultantly outputted as data of 15 Mbps, the time base is compressed to a degree ten times greater than that when no time base compression processing is implemented.

The frame forming and modulating circuit 102 implements frame formation processing for forming a transmission unit (frame) of picture data every block to which the data compression processing and the time base compression processing have been implemented and adding an error correcting code thereto. This circuit 102 further implements a predetermined modulation processing thereto to thereby form picture data having a transmission rate of, e.g., 25 Mbps to output it through transmission cable 103.

By implementing such processing, it is possible to transfer picture/audio data by effectively utilizing a limited frequency band. For example, it is possible to transfer cinema-like picture/audio data of two hours in 12 minutes (time which is one tenth of 120 minutes (two hours)).

It is to be noted that in the case of multiplexing channels, a multiplexer is provided at the preceding stage or the succeeding stage of the frame forming and modulating circuit 102. By this multiplexer, picture/audio data as described above are multiplexed.

In this multiplexing, if, e.g., transmission band of cable line 103 is 25 Mbps, it is possible to multiplex the picture/audio data of about 10 channels (1.5 Mbps×10 channels+ redundancy=25 Mbps by addition of parity or modulation).

However, if time base expansion processing and data expansion processing, etc. are implemented to picture/audio data transmitted from the compression transmitting apparatus as described above so that original picture/audio data results to record it, a quantity of data to be recorded is increased. For example, there may take place an unreasonableness such that recording time as long as two hours is required while transmission time is 12 minutes.

Further problem is that since picture/audio data is transmitted in the state where complicated compression processing as described above are implemented thereto, a special decoder device is required for reproducing such data.

OBJECT AND SUMMARY OF THE INVENTION

This invention has been made in view of the above-described problems, and its object is to provide a recording/reproducing apparatus and a reproducing apparatus which can record, in a short recording time, without use of any special decoder device, picture/audio data which has been transmitted in the state where such data has undergone time base compression processing, etc., and which can provide a display picture having good picture quality at the time of reproduction.

To achieve the above-mentioned object, in accordance with this invention, there is provided a recording/reproducing apparatus comprising: recording means for recording, onto a recording medium, time base compression processing implemented digital data delivered from the external; control means for carrying out a control to read out the digital data from the recording medium at a speed lower than a recording speed in dependency upon the time base compression processing implemented to the digital data; and output means for outputting, as a reproduction output, the digital data which has been read out from the recording medium.

This recording/reproducing apparatus records time base compression processing implemented digital data delivered from the external onto a recording medium, e.g., a magnetic tape, etc.

Digital data recorded on the magnetic tape is processed as follows. Namely, at the time of reproduction, in dependency upon the time base compression processing implemented to the digital data, the control means controls the magnetic tape so that it runs at a speed lower than that at the time of recording, and conducts a control to rotationally drive the rotary head at a speed lower than that at the time of recording. Thus, the same recording track on which the digital data is recorded is scanned at least once by the rotary head. As a result, the digital data is reproduced. By control of such reproduction speeds, time base expansion processing is implemented to digital data recorded in the state where the time base compression processing is implemented thereto. Then, the output means selects only valid (effective) digital data of digital data reproduced by the rotary head to output the selected data.

In the case of carrying out fast-feed reproduction or rewinding reproduction, the control means carries out a control to travel (run) the magnetic tape at a high speed. The output means selects only valid digital data of digital data obtained by tracing of the rotary head.

Further, in accordance with this invention, there is also provided a reproducing apparatus comprising: control means for carrying out a control to read out the time base compression processing implemented digital data at a speed corresponding to the time base compression processing from a recording medium on which the digital data is recorded; and output means for outputting, as a reproduction output, digital data which has been read out from the recording medium.

This reproducing apparatus is directed to a reproducing apparatus adapted for reproducing time base compression processing implemented digital data from a recording medium, e.g., a magnetic tape on which such digital data is recorded, etc. In dependency upon the time base compression processing implemented to the digital data, the control means conducts a control such that the magnetic tape runs at a speed lower than that at the time of recording, and conducts a control to rotationally drive the rotary head at a speed lower than that at the time of recording. Thus, the same recording track on which the digital data is recorded is scanned at least once by the rotary head so that such digital data is reproduced. By control of such reproduction speeds, time base expansion processing is implemented to digital data recorded in the state where it has undergone the time base compression processing. Then, output means selects only valid digital data of digital data reproduced by the rotary head to output the selected digital data.

In addition, in the case of carrying out fast-feed reproduction or rewinding reproduction, the control means carries out a control to run the magnetic tape at a high speed. The output means selects only valid digital data of digital data obtained by tracing of the rotary head to output the selected digital data.

DESCRIPTION OF THE PREFERRED EMBODIMENT

A preferred embodiment of a recording/reproducing apparatus and a reproducing apparatus according to this invention will now be described with reference to the attached drawings.

The recording/reproducing apparatus and the reproducing apparatus according to this invention can be applied to, e.g., a digital video tape recorder equipment.

Figure 1:
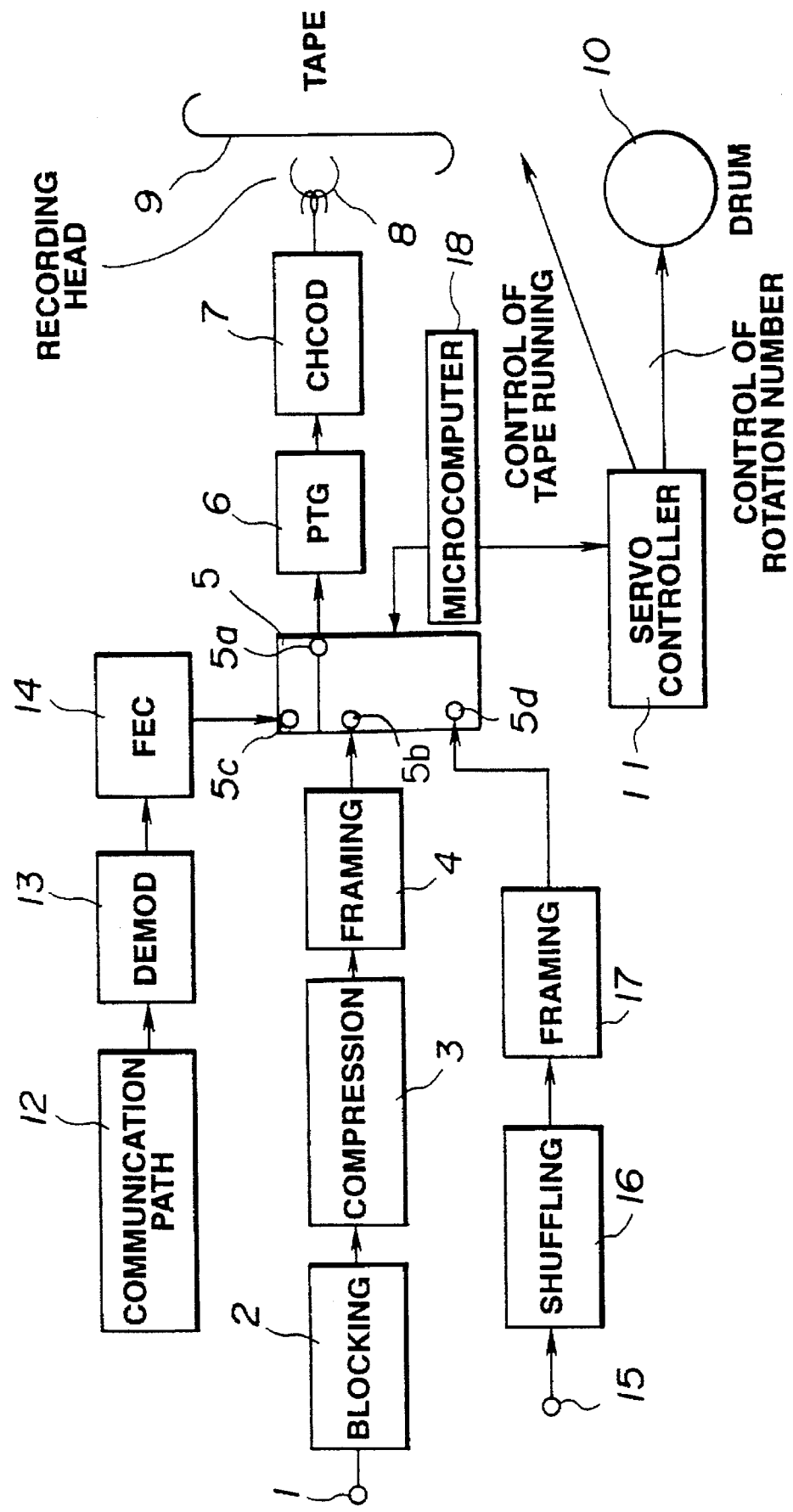
FIG. 1 is a block diagram for explaining recording operation of a digital video tape recorder equipment in the embodiment where a recording/reproducing apparatus and a reproducing apparatus according to this invention are applied to the digital video tape recorder equipment.
Figure 3:
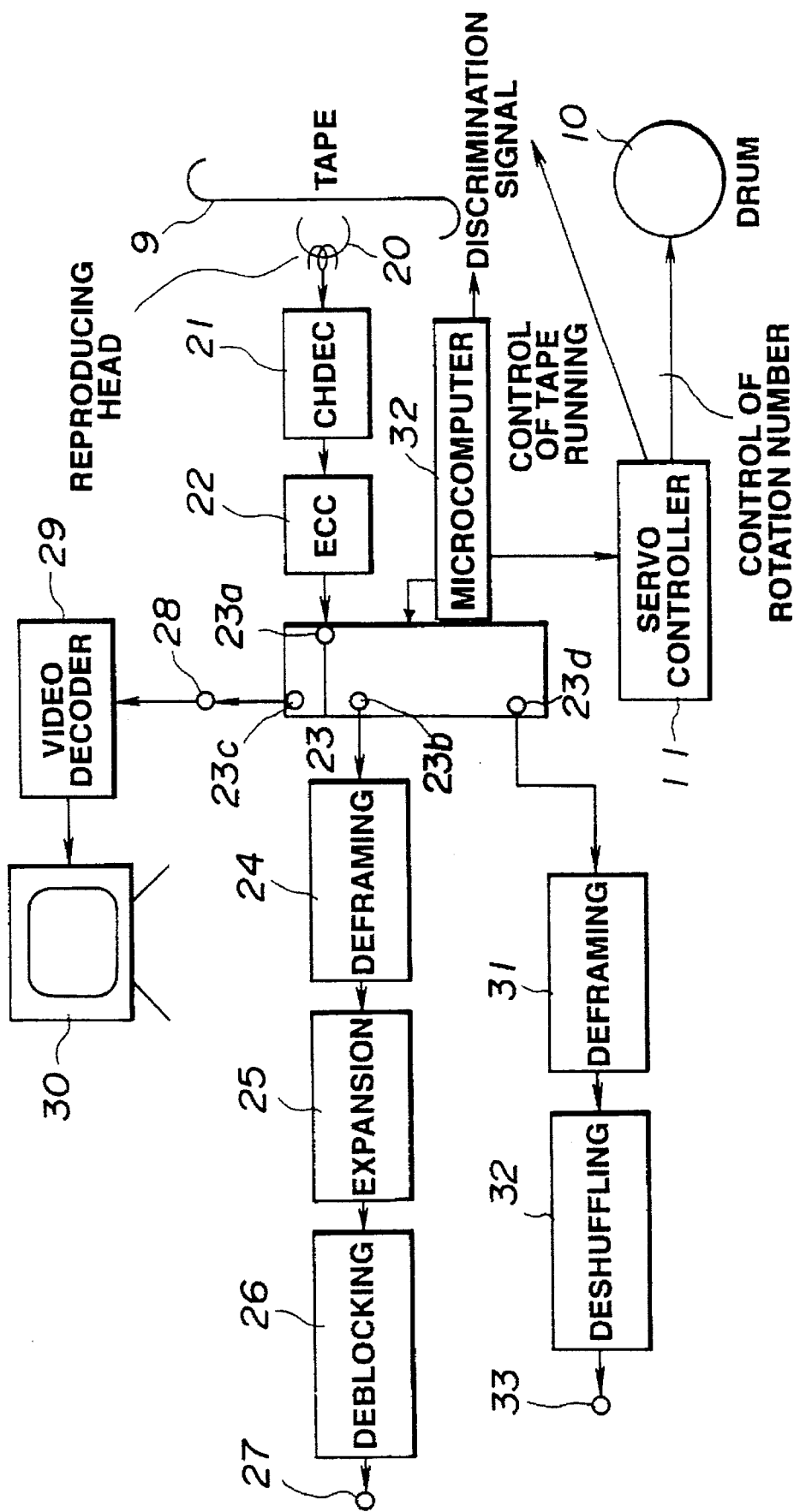
FIG. 3 is a block diagram for explaining an ordinary reproducing operation of the digital video tape recorder equipment.
Figure 4:
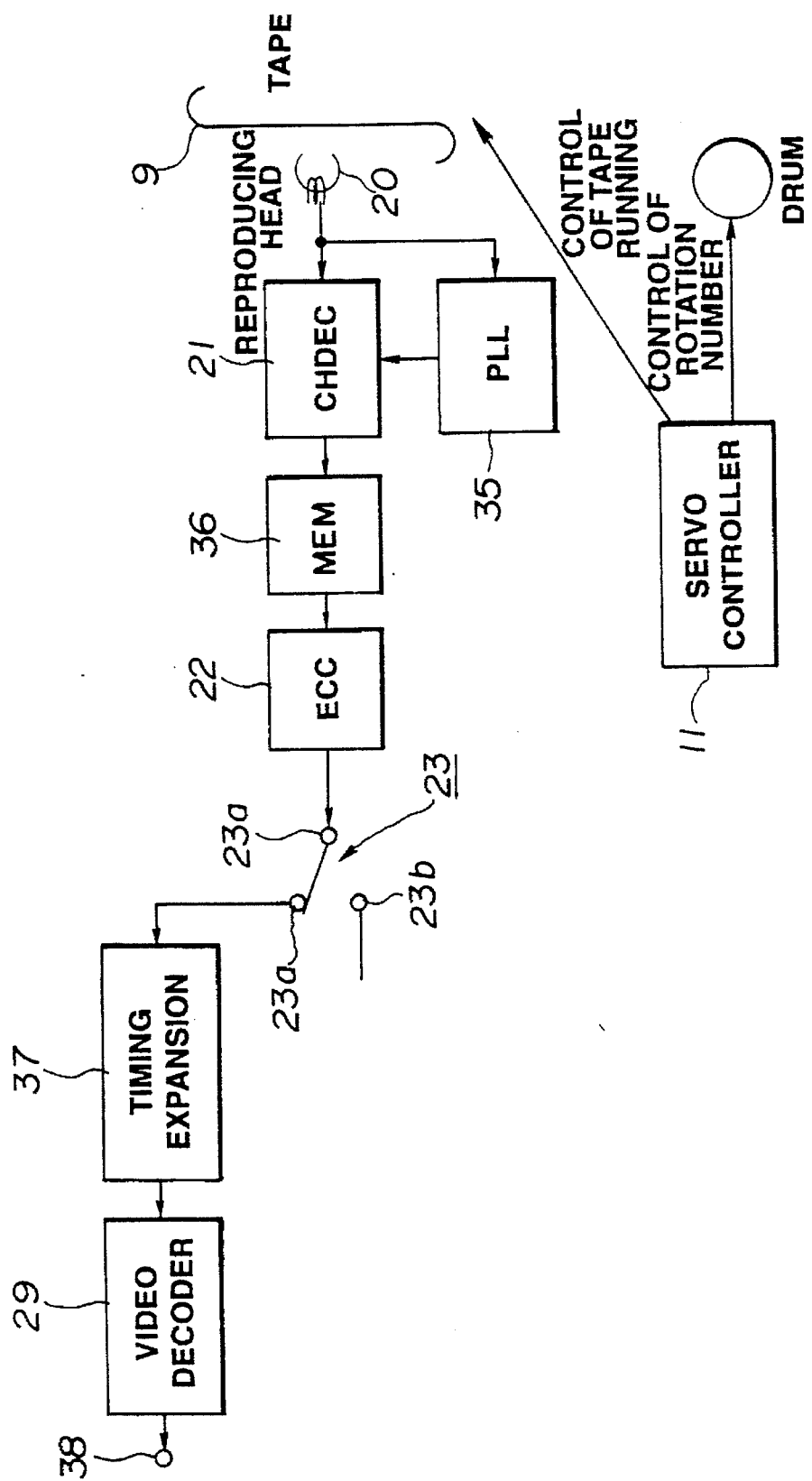
FIG. 4 is a block diagram for explaining a fast-feed reproducing operation and a rewinding reproducing operation of the digital video tape recorder equipment.

The digital video tape recorder equipment according to this embodiment is composed of a recording system serving as recording means shown in FIG. 1 and reproducing systems shown in FIGS. 3 and 4.

Initially, in the recording system shown in FIG. 1, in the case of carrying out recording of ordinary picture data (e.g., NTSC signal, etc.) to which both time base compression and data compression are not implemented, this picture data is delivered to a blocking circuit 2 through input terminal 1.

This blocking circuit 2 divides picture data of, e.g., one frame into blocks of 16 pixels×16 pixels and implements shuffling processing thereto to select only picture data of valid blocks (except for data of the vertical blanking period) as data to deliver it to a compressing circuit 3.

The compressing circuit 3 implements, e.g., so called DCT processing (Discrete Cosine Transform processing) every block to picture data which has been read out from the blocking circuit 2 to transform the picture data into data on the frequency base to thereby carry out data compression. The picture data to which the data compression has been implemented is delivered to a framing memory 4.

This framing memory 4 stores picture data every block which has undergone compression processing by the compressing circuit 3 and has been delivered therefrom, thus to form picture data of, e.g., one frame. Then, picture data stored in the framing memory 4 is converted into data of a predetermined format suitable for recording at the time point when data of one frame is prepared, and is read out from the framing memory 4.

It is to be noted that, at the time of recording of ordinary picture data, a changeover switch 5 is subjected to switching control by microcomputer 18 so that terminal 5b is selected by select terminal 5a. For this reason, picture data which has been read out from the framing memory 4 is delivered to a parity generator (PTG) 6 through the changeover switch 5.

The parity generator 6 adds so called error correcting code (parity) to picture data to deliver it to a modulating circuit 7 serving as channel coding means (CHCOD).

The modulating circuit 7 implements a predetermined modulation for recording to the picture data to deliver it to a recording head 8 which is so called a rotary head.

The traveling (running) speed of a magnetic tape 9 which is a recording medium at the time recording is controlled by a control circuit (servo controller) 11 so that it becomes equal to 18.8 mm/sec. The rotational speed of the recording head 8 is controlled by rotational control of drum motor 10 by the control circuit 11 so that it becomes equal to 9000 rpm.

Thus, the recording head 8 carries out so called azimuth recording of the picture data at a rotation number of 9000 rpm onto the magnetic tape 9 which is subjected to running control at the 18.8 mm/sec.

While recording of picture data has been described above, recording of an audio signal will be described below. Digitized audio data is inputted to input terminal 15, and is then delivered to a shuffling circuit 16. This shuffling circuit 16 carries out shuffling for distributing (dispersing) recording positions of data to prevent errors from concentrating on a specific portion. The shuffled audio data is delivered to a framing memory 17. The framing memory 17 converts data into data of a predetermined format suitable for recording at the time point when audio data of one frame is prepared similarly to the above-mentioned framing memory 4, and reads it out therefrom. The audio data which has undergone such processing is delivered to selected terminal 5d. When there results a timing for recording audio data, switch 5 is switched to selected terminal 5d by microcomputer 18. As a result, error correcting code is added to the audio data at parity generator (PTG) 6, and the audio data undergoes a predetermined modulation for recording at modulating circuit 7. The modulated data is delivered to recording head 8. Thus, recording of audio data is carried out.

Figure 2:
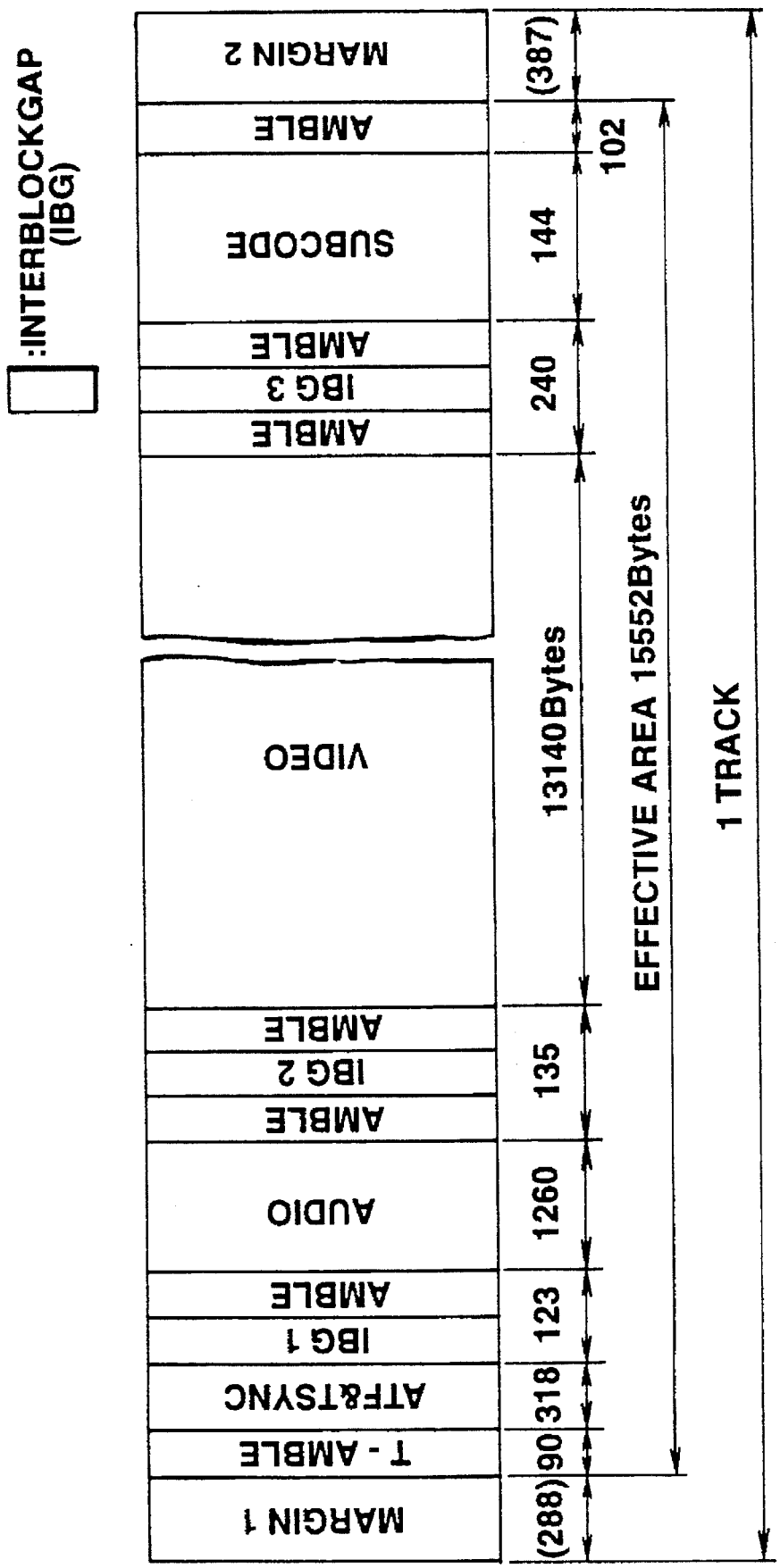
FIG. 2 is a view showing the format of video data recorded by the digital video tape recorder equipment.

The picture/audio data recorded in this way has a track recording format as shown in FIG. 2. Namely, data is recorded from the portion initially in contact with the medium of the magnetic head in the state divided into synchronizing data block (ATF & Timing sync) of 318 bytes for carrying out tracking and synchronization, audio data block (Audio) of 1260 bytes, picture data block (Video) of 13140 bytes, and subcode data block (Subcode) of 144 bytes. Further, three interblock gaps (IBG1~IBG3) are provided between respective blocks. It is to be noted that track format which can be employed is not limited to the above-mentioned track format, but any other track format may be employed.

Ordinary picture data thus recorded is reproduced by the reproducing system shown in FIG. 3.

Namely, at the time of reproducing the ordinary picture data, the magnetic tape 9 and the drum motor 10 are subjected to control by the control circuit 11 similarly at the time of recording so that the running speed becomes equal to 18.8 mm/sec, and the rotational speed becomes equal to 9000 rpm, respectively.

Reproducing head 20 traces recording tracks on the magnetic tape 9 under such control to carry out reproduction of the picture data. The picture data reproduced by the reproducing head 20 is delivered to a demodulating circuit 21 serving as channel decoding means (CHDEC).

The demodulating circuit 21 implements demodulation processing opposite to that in the modulating circuit 7 to picture data from the reproducing head 20 to deliver it to an error correcting circuit 22.

The error correcting circuit 22 implements error correcting processing to the picture data to output it. At the time of ordinary reproduction, a changeover switch 23 is subjected to switching control by a microcomputer 32 so that terminal 23b is selected by select terminal 23a. For this reason, picture data from the error correcting circuit 22 is delivered to a deframing circuit 24 through the changeover switch 23.

The deframing circuit 24 divides the picture data into blocks to deliver each block data to expanding circuit 25. The expanding circuit 25 implements data expansion processing opposite to that in the compressing circuit 3 on every block of data to deliver it to a deblocking circuit 26.

The deblocking circuit 26 stores picture data every block which has undergone the data expansion processing and has been delivered to form picture data, e.g., every frame, and implements a processing thereto such that respective pictures are arranged in order of original pictures to deliver it to, e.g., monitor device 30 or any other digital video tape recorder, etc. through output terminal 27.

On the other hand, audio data is reproduced by reproducing head 20, and is processed at demodulating circuit 21 and error correcting circuit 22 along with the picture data. By the timing at which an audio signal is outputted, microcomputer 32 switches select terminal 23a of changeover switch 23 to selected terminal 23d. Thus, this audio data is delivered to deframing circuit 31. Processing opposite to that in the framing memory 17 at the time of recording is carried out at the deframing circuit 31. The audio data thus processed is delivered to a deshuffling circuit 32. Processing opposite to shuffling in shuffling circuit 16 at the time of recording is carried out at the deshuffling circuit 32. The audio data thus processed is delivered to, e.g., an audio amplifier, (not shown) etc. through output terminal 33, and is then delivered to a speaker (now shown).

Figure 6:
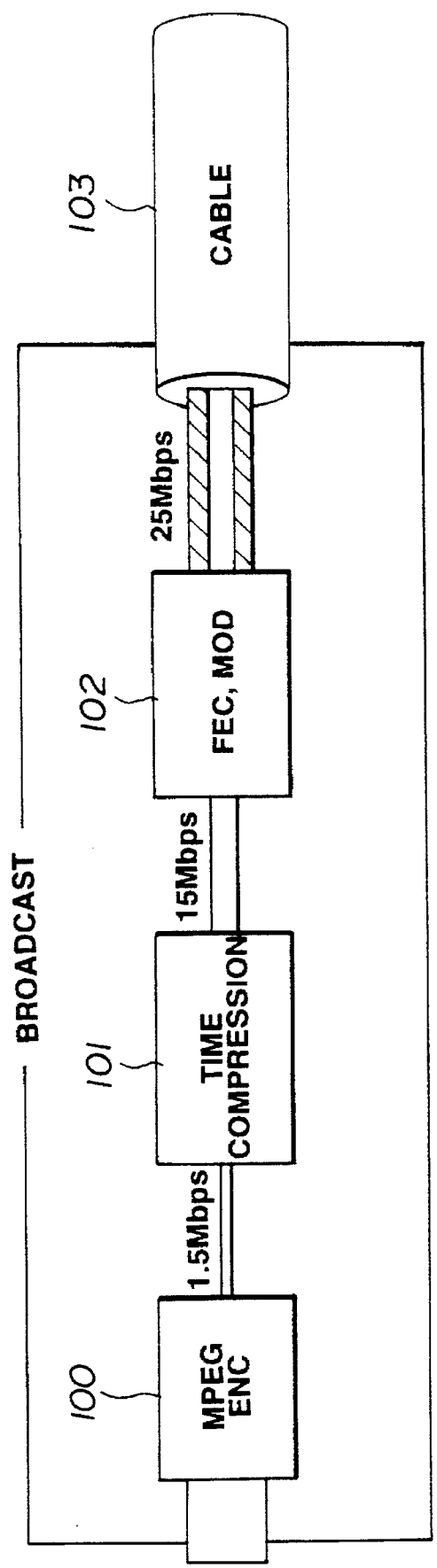
FIG. 6 is a block diagram for explaining data compression processing and time base compression processing, etc. to be implemented to video data on the broadcasting station side.

Explanation will now be given in connection with the case where, in FIG. 1, the digital video tape recorder equipment records picture/audio data which has been subjected to data compression processing and time base compression processing, etc. by a compression transmitting device as shown in FIG. 6 and has been transmitted at a transmission rate of, e.g., 25 Mbps. This time base compressed picture/audio data is delivered to demodulating circuit 13 through communication path 12.

Since, in transmitting picture/audio data, the compression transmitting device shown in FIG. 6 adds error correcting code to picture data which has undergone data compression processing and time base compression processing and implements a predetermined modulation thereto before transmission, the demodulating circuit 13 demodulates the picture data to deliver it to error correcting circuit 14.

The error correcting circuit 14 implements error correcting processing to the picture/audio data to output it. In this instance, in recording picture/audio data to which time base compression processing, etc. has been implemented, the changeover switch 5 is subjected to switching control by microcomputer 18 so that terminal 5c is selected by select terminal 5a. For this reason, picture/audio data from the error correcting circuit 14 is delivered to parity generator 6 through the changeover switch 5. The transmission rate at this time point is 15 Mbps.

The parity generator 6 adds an error correcting code for error correction at the time of recording/reproduction to the picture/audio data as described above to deliver it to modulating circuit 7. The modulating circuit 7 implements a predetermined modulation for recording to the picture/audio data to deliver it to the recording head 8.

Also in this case, running speed of the magnetic tape 9 is controlled by control circuit 11 so that it becomes equal to 18.8 mm/sec, and rotational speed of the recording head 8 is controlled by rotational control of drum motor 10 by the control circuit 11 so that it becomes equal to 9000 rpm.

Thus, the recording head 8 carries out so called azimuth-recording of the picture data at rotational speed of 9000 rpm onto the magnetic tape 9 subjected to running speed control at the 18.8 mm/sec. The time base compressed picture/audio data is recorded into the video data area of FIG. 2 in the case where transmission rate is less than 25 Mbps. In the event that transmission rate is more than 25 Mbps, recording is carried out by using audio data area as well. Further, discrimination code indicating that time base compressed data is recorded is recorded into a subcode area. It is to be noted that this discrimination data may be stored not only in the subcode area but also on a recording medium or on a recording medium cassette. For example, such discrimination data may be stored in a memory mounted in the cassette, or may be recorded in an additional data area provided in a portion of picture data area and audio data area.

As stated above, an approach is employed to record picture/audio data, which has undergone time base compression processing, etc. and has been transmitted, as it is without implementing time base expansion processing, etc. thereto, thereby making it possible to record, e.g., data of 2 hours in short time of 12 minutes, and to record it in the recording area of 12 minutes at the time of recording of ordinary signal (NTSC). Thus, storage space in magnetic tape 9 can be saved.

Reproduction of the time base compressed picture/audio data recorded in this way will now be described with reference to FIG. 3. The control circuit 11 controls the running speed of the magnetic tape 9 so that it becomes equal to the running speed of 1.88 mm/sec which is one tenth of that at the time of recording, and rotationally controls the drum motor 10 so that its rotational speed becomes equal to the rotational speed which is one tenth of that at the time of recording.

Thus, not only is the reproducing head 20 brought into the state of "on track", thus making it possible to trace recorded picture/audio data, but also it is possible to convert picture/audio data recorded at a transmission rate ten times greater than the original transmission rate into data of the original transmission rate (expansion processing of time base) to reproduce it.

The picture/audio data reproduced by the reproducing head 20 is delivered to demodulating circuit 21.

The demodulating circuit 21 implements demodulation processing opposite to that in the modulating circuit 7 to picture data from the reproducing head 20 to deliver it to error correcting circuit 22.

In the case where discrimination data indicating whether a recorded signal is a time base compressed signal or an ordinary television broadcasting signal is recorded on magnetic tape, its discrimination data is reproduced and is delivered to microcomputer 32.

The error correcting circuit 22 implements error correcting processing to the picture/audio data to output it. At the time of reproduction of picture/audio data which had undergone time base compression processing, etc., changeover switch 23 is subjected to switching control by microcomputer 32 by using the discrimination data so that terminal 23c is selected by select terminal 23a. Thus, picture/audio data from the error correcting circuit 22 is delivered to output terminal 28 through the changeover switch 23.

A video decoder 29 which is a MPEG decoder with respect to MPEG encoder 100 shown in FIG. 6 is connected to the output terminal 28, and the picture/audio data outputted through the output terminal 28 is delivered to the video decoder 29.

The video decoder 29 implements decoding processing opposite to the coding implemented at the MPEG encoder 100 to the video/audio data to thereby form picture/audio data of 2 hours from picture/audio data of, e.g., 12 minutes to which time base compression processing, etc. has been implemented to deliver it to monitor device 30, etc.

As stated above, the digital video tape recorder equipment according to this embodiment can record, onto magnetic tape, picture/audio data, which has undergone time base compression processing, etc. and can control, at the time of reproduction, in dependency upon the time base compression processing, etc., the traveling speed of the magnetic tape and the rotational speed of the rotary head so that these speeds become equal to speeds lower than those at the time of recording to carry out expansion, etc. of the time base of the picture/audio data, thus to reproduce it.

For this reason, it is possible to reproduce, in two hours on the user side, picture/audio data which has been transmitted in a transmission time of 12 minutes from, e.g., broadcasting station side. Thus, it is possible to provide an entirely novel data transmission system sufficiently utilizing the transmission band.

Further, since, at the time of reproduction, the rotation number of the rotary head is allowed to be lower than that at the time of recording to carry out reproduction of picture data to which time base compression processing, etc. has been implemented, abrasion of the magnetic tape by friction of the rotary head can be prevented.

In the digital video tape recorder equipment according to this embodiment, by using a reproducing system of the structure as shown in FIG. 4, even if the drum motor 10 is rotationally driven at a rotational speed of 1800 rpm with the traveling speed of the magnetic tape 9 being as 1.88 mm/sec, it is possible to reproduce picture/audio data to which the time base compression, etc. has been implemented.

In this case, the reproducing head 20 obliquely traverses a single track to carry out one or two scans. Accordingly, scan is carried out only once with respect to a certain portion in a single track, and scan is carried out twice in another portion. Since the reproducing head 20 is not brought into the state of "just on track" on the track, no tracking servo is carried out at this time. The picture/audio data thus reproduced is delivered to the demodulating circuit 21, and is also delivered to PLL (Phase Locked Loop) circuit 35.

The PLL circuit 35 is constructed in accordance with a transfer rate of picture/audio data to be reproduced to carry out switching between clock frequency when the drum motor 10 is rotationally driven at 9000 rpm and that when it is rotationally driven at 1800 rpm to output a selected clock frequency. The clock signal from the PLL circuit 35 is delivered to the demodulating circuit 21.

As described above, since the number of times scanned by the reproducing head 20 varies in dependency upon portions of the track, the demodulating circuit 21 detects whether or not synchronization data recorded at synchronization data block shown in FIG. 2, for example, is correct. Thereby, it is detected whether or not current picture/audio data is valid data so that only data judged to be valid is delivered and stored thereinto.

When the drum motor 10 is rotationally driven at a rotation speed of 1800 rpm, the same track is traced once or twice. For this reason, when two times of traces have at the maximum been completed, picture data of one track is stored into the memory 36. At the time point when picture data of one track is prepared, picture data stored in the memory 36 is read out. The picture data which has been read out is delivered to the error correcting circuit 22.

The error correcting circuit 22 implements error correcting processing to the picture data to deliver it to time base expanding circuit 37 through changeover switch 23.

The time base expanding circuit 37 expands the picture data delivered once with respect to two times of scans at the maximum of the reproducing head 20 so that its data length is twice greater than the original data on the time base to convert the transfer rate into one half thereof to output it. This picture data is delivered via output 38 to a monitor device (not shown), etc. through the video decoder 29.

Thus, not only can a reproduction image be obtained on the monitor device similar to that at the time of reproduction described above, but also tracking servo at the time of reproduction can become unnecessary.

The case where fast-feed reproduction or rewinding reproduction of triple speed is carried out will now be described. Such a reproduction can be realized also by controlling the rotational speed of the drum motor and the tape traveling speed.

The control circuit 11 carries out a traveling control such that traveling speed of the magnetic tape 9 becomes equal to 5.64 mm/sec, carries out a rotational control of drum motor 10 so that rotational speed becomes equal to 2700 rpm, and carries out a tracking control. Namely, the drum motor is rotated and the tape is run at speeds three times greater than those at the time of reproducing time base compressed picture/audio data in FIG. 3.

The control circuit 11 of FIG. 4 carries out traveling speed of the magnetic tape so that it becomes equal to 5.64 mm/sec, and rotationally controls the drum motor 10 so that its rotational speed becomes equal to 9000 rpm to thereby scan the same track a plurality of number of times (three times at the maximum), thus making it possible to carry out reproduction of triple speed. At this time, tracking servo can become unnecessary.

Figure 5:
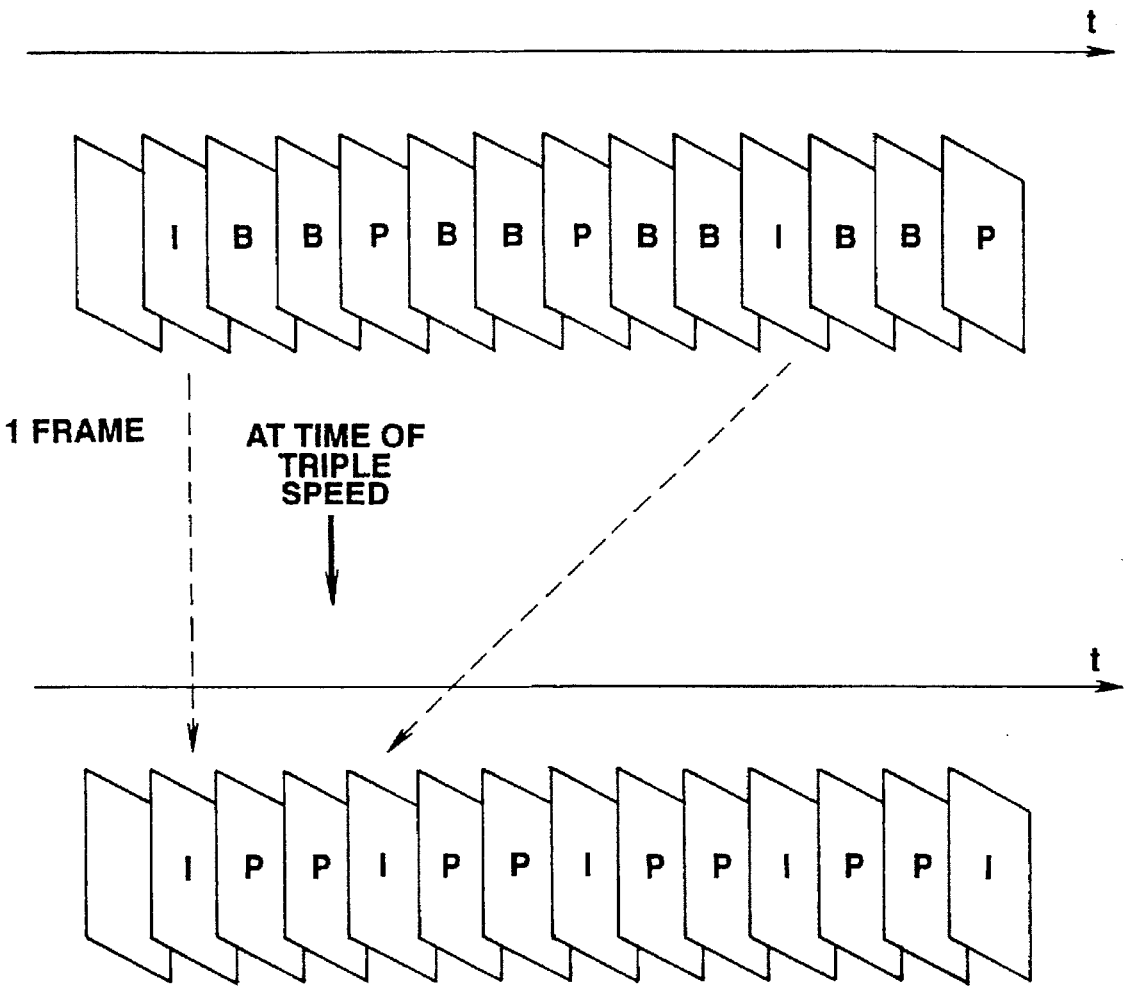
FIG. 5 is a model view for explaining the operation for selecting and outputting only valid video data of video data reproduced by the fast-feed reproduction and the rewinding reproduction.

Picture data to which coding processing has been implemented at the MPEG encoder 100 is recorded onto the magnetic tape in order of I picture, B picture, B picture, P picture, B picture, B picture, P picture, B picture, B picture, I picture . . . as shown in FIG. 5, for example. By carrying out such fast-feed reproduction or rewinding reproduction, it is possible to select only the I picture or the P picture to output it. Thus, a triple speed reproduction picture of high picture quality can be obtained.

It is to be noted that while it has been described in the above-described embodiment that the recording medium is magnetic tape, such recording medium may be semiconductor memory or optical disc (so called CD memory or magneto-optical disc, etc.).

As apparent from the above-described description, the recording/reproducing apparatus according to this invention can record time base compressed digital data delivered from the external as it is and implement time base expansion processing thereto at the time of reproduction to reproduce it. For this reason, on the broadcasting station side, it is possible to transmit digital data of, e.g., 2 hours only in 12 minutes. Thus, it is possible to provide a data transmission system of the entirely new system sufficiently utilizing communication capacity. Further, since, at the time of reproduction, the rotation number of the rotary head is allowed to be lower than that at the time of recording to carry out reproduction of digital data, abrasion of magnetic tape by friction of the rotary head can be prevented. Further, since the same recording track on which the digital data is recorded is scanned at least once by the rotary head, thereby making it possible to carry out reproduction of digital data, there is no necessity of carrying out phase servo, the servo mechanism for reproduction can be simplified, and the cast can be reduced. Further, since it is possible to output only valid digital data at the time of reproduction, the picture quality of reproduction pictorial image can be improved. In addition, since, at the time of fast-feed reproduction or the rewinding reproduction, only the magnetic tape is caused to run at a high speed with the rotational number of the rotary head being caused to a rotational number at the time of reproduction, it is possible to improve the picture quality of fast-feed reproduction pictorial image or rewinding reproduction pictorial image.

The reproducing apparatus according to this invention implements time base expansion processing to digital data to which time base compression processing is implemented to reproduce that digital data from a recording medium, e.g., a magnetic tape, etc. on which the digital data is recorded. For this reason, media on which time base compression processing implemented digital data is recorded can be developed. This can contribute to reduction of capacity of the media. Further, at the time of reproduction, the rotational number of the rotary head is allowed to be lower than that at the time of recording to carry out reproduction of digital data. For this reason, abrasion of the magnetic tape by friction of the rotary head can be prevented. Further, the same recording track on which the digital data is recorded is scanned at least once by the rotary head, thereby making it possible to carry out reproduction of digital data. For this reason, there is no necessity of carrying out phase servo, the servo mechanism for reproduction can be simplified, and the cost can be reduced. Furthermore, since it is possible to output only valid digital data of reproduced digital data, the picture quality of reproduction picture can be improved. In addition, at the time of fast-feed reproduction or rewinding reproduction, only the magnetic tape is run at a high speed with the rotation number of the rotary head being caused to be a rotation number at the time of reproduction. For this reason, the picture quality of fast-feed reproduction picture or rewinding reproduction picture can be improved.

What is claimed is:

1. A recording/reproducing apparatus, comprising:

recording means for recording time base compressed digital data received from an outside source onto a recording medium at a recording speed;

control means for controlling a read out of the digital data from the recording medium at a speed slower than said recording speed, the read out speed being based on processing that had been implemented to time base compress the digital data; and output means for outputting the digital data read out from the recording medium.

2. A recording/reproducing apparatus according to claim 1, wherein the recording medium is a magnetic tape, and wherein the control means runs the magnetic tape at a traveling speed slower than that at the time of recording, and rotationally drives a rotary head at a rotational speed slower than that at the time of recording.

3. A recording/reproducing apparatus according to claim 2, wherein the control means controls the rotational speed of the rotary head and the traveling speed of the magnetic tape to trace, up to a plurality of number of times, the same recording track on which the digital data is recorded, and further comprising detecting means for detecting whether or not synchronization data, included in the recorded data, is correct, thereby determining the presence of valid data in the digital data read out from the recording medium by the tracing of the magnetic head, wherein the output means outputs only the determined valid data.

4. A recording/reproducing apparatus according to claim 3, wherein the control means runs the magnetic tape at a high traveling speed to carry out fast-feed reproduction or rewinding reproduction.

5. A recording/reproducing apparatus according to claim 2, wherein the control means runs the magnetic tape at a high traveling speed to carry out fast-feed reproduction or rewinding reproduction.

6. A reproducing apparatus, comprising:

control means for controlling a read out from a recording medium of prerecorded time base compressed digital data, said digital data having been time base compressed in accordance with a particular compression processing, at a read out speed corresponding to the time base compression processing of the prerecorded digital data, wherein the control means controls a rotational speed of a head and a traveling speed of the recording medium to trace, up to a plurality of number of times, the same recording track on which the digital data is recorded, detecting means for detecting whether or not synchronization data, included in the recorded data, is correct, thereby determining the presence of valid data in the digital data read out from the recording medium by tracing of the magnetic head, and output means for outputting the digital data read out from the recording medium wherein the output means outputs only the determined valid data.

7. A reproducing apparatus according to claim 6, wherein the control means runs the magnetic tape at a high traveling speed to carry out fast-feed reproduction or rewinding reproduction.

8. A recording/reproducing apparatus for digitally recording and reproducing an analog or digital picture/audio signal, comprising:

first input means for inputting time base compressed digital data to which compression coding and time base compression processing have been implemented;

first recording signal processing means for demodulating and performing error correction on the time base compressed digital data;

second input means for inputting an analog signal;

an analog-to-digital converter to convert the input analog signal into predetermined digital data;

second recording signal processing means for compression-coding at least the predetermined digital data;

a changeover switch for receiving an output of the first recording signal processing means and an output of the second recording signal processing means;

control means for controlling said changeover switch based on the input analog signal or the input time base compressed digital data;

parity generator means for adding parity to the data output from the first or second recording signal processing means, which is received as an output of the changeover switch;

channel coding means for modulating an output of the parity generator means;

recording means for recording the modulated signal onto a recording medium;

read out means for reading out the digital data from the recording medium, said read out means being controlled by said control means to read out the digital data at a speed slower than a recording speed based on the time base compression processing that was implemented to time base compress the digital data; and output means for outputting the digital data read out from the recording medium.

9. A recording/reproducing apparatus according to claim 8, wherein the modulated data includes discrimination data to indicate whether the signals output from the first and second recording signal processing means and recorded onto the recording medium include time base compressed data.

10. A reproducing apparatus for reproducing prerecorded analog or digital picture/audio data, said data having been selectively time base compressed, comprising:

reproducing means for reproducing the prerecorded data from a recording medium at a speed slower than a recording speed, the reproducing speed being based on processing that had been implemented to time base compress the prerecorded data;

channel decoding means for demodulating the reproduced data;

error correction means for performing error correction on the demodulated data;

a changeover switch for receiving the error corrected data;

first reproduction signal processing means connected to the changeover switch to reproduce the time base compressed data; and second reproduction signal processing means connected to the changeover switch to reproduce non-time base compressed data; and control means for controlling the changeover switch based on discrimination data recorded on the recording medium and for controlling a drive speed of a recording medium drive means.

11. A reproducing apparatus according to claim 10, wherein the recording medium is a magnetic tape, wherein the recording medium drive means includes a rotary head drum motor and a capstan motor, and wherein the control means controls rotational speeds of the rotary head drum motor and the capstan motor.

* * * * *